June 5, 1945. W. F. BOLDT 2,377,748
YIELDABLE DEVICE
Filed Sept. 7, 1942   2 Sheets-Sheet 2
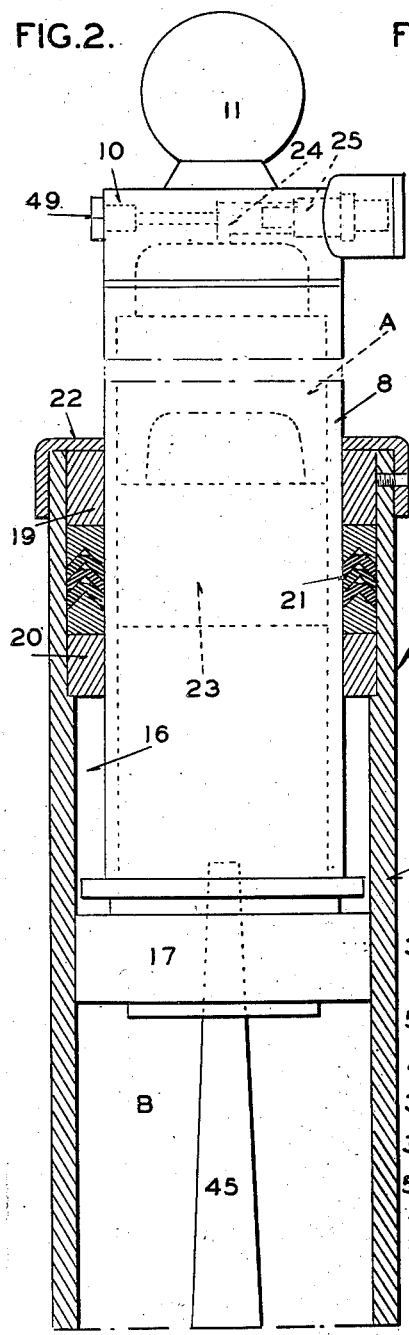
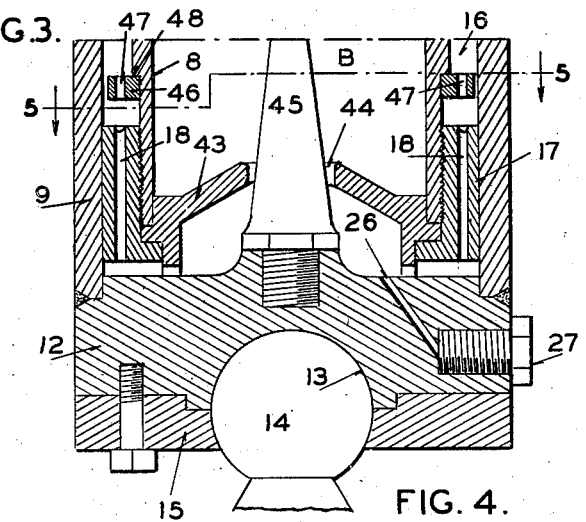
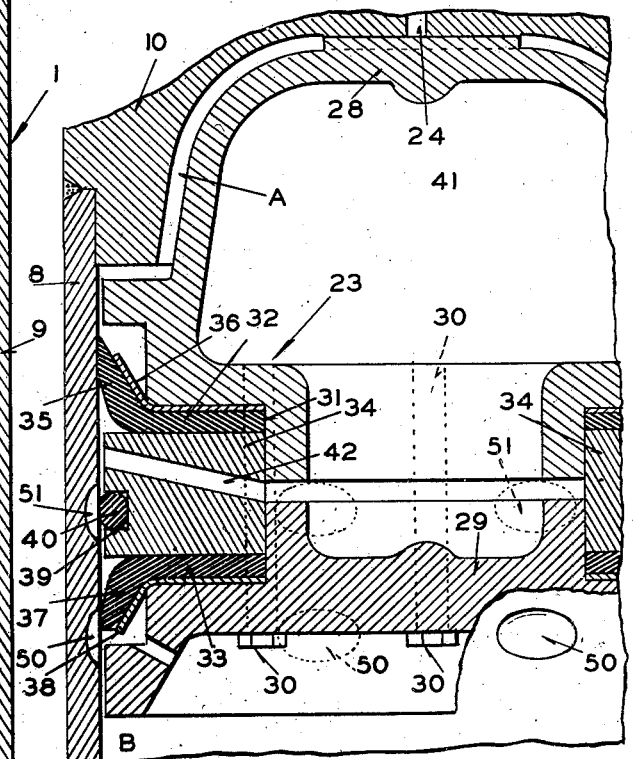
INVENTOR
W. F. BOLDT
BY
ATTORNEY Patented June 5, 1945

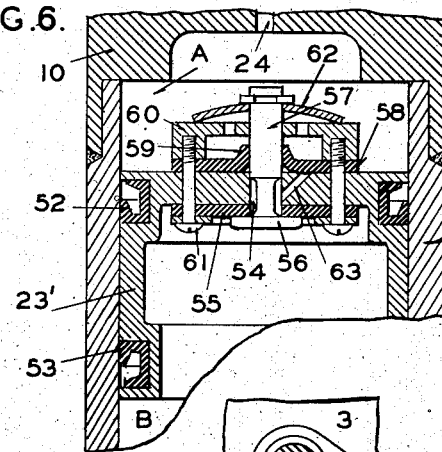
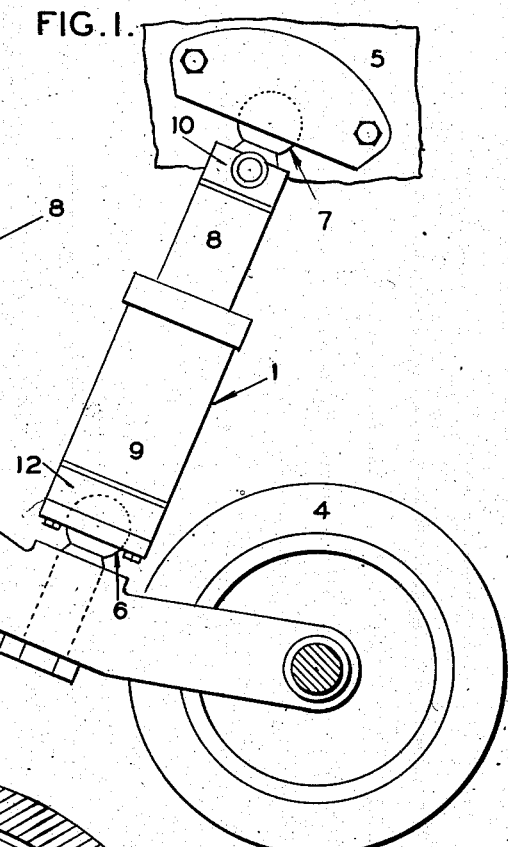
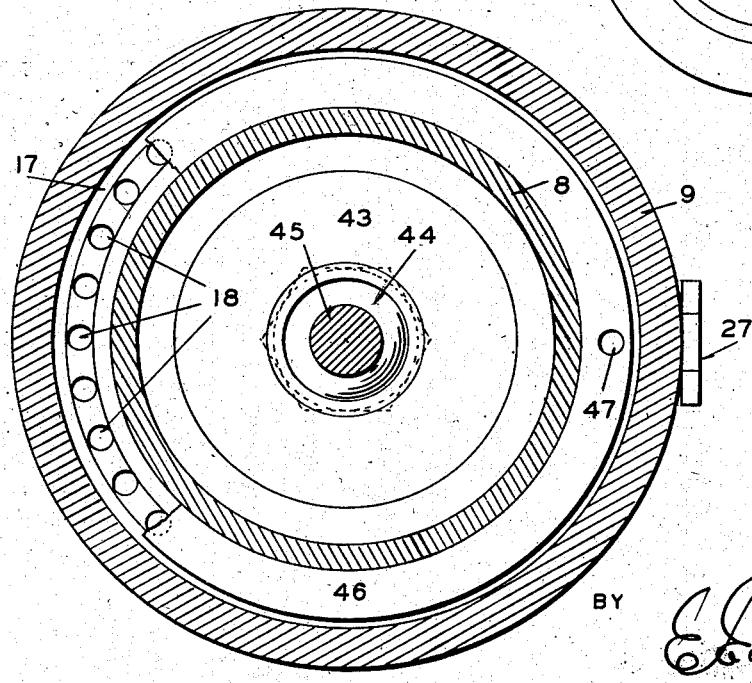

2,377,748

UNITED STATES PATENT OFFICE 2,377,748

YIELDABLE DEVICE

Werner F. Boldt, Clayton, Mo., assignor to Wagner Electric Corporation, St. Louis, Mo., a corporation of Delaware Application September 7, 1942, Serial No. 457,603

7 Claims. (Cl. 267—64)

My invention relates to improvements in yieldable devices and more particularly that type of device in which relatively movable telescoping cylinders contain a body of non-compressible fluid and a body of compressible fluid under pressure with said fluids being separated by a piston.

One of the objects of my invention is to provide in a yieldable device of the type referred to, improved means for minimizing leakage of fluid past the piston in either direction.

Another object of my invention is to provide improved means for permitting the proper filling of the yieldable device with the fluids used therein.

Other objects of my invention will become apparent from the following description taken in connection with the accompanying drawings in which Figure 1 is a view of my improved yieldable device showing it being used as a strut between a wheel and the body of a vehicle; Figure 2 is a partial sectional view showing the telescoping arrangement of the cylinders; Figure 3 is a sectional view of the lower ends of the cylinders when they are fully telescoped; Figure 4 is an enlarged sectional view of the piston and sealing means with the piston at the extreme upper end of the inner cylinder; Figure 5 is a sectional view taken on the line 5—5 of Figure 3; and Figure 6 is a sectional view of a piston having associated therewith a different valve means for aiding the filling of the device with the proper volume of non-compressible fluid.

Referring to the drawings in detail and first to Figure 1, I have shown my improved yieldable device I employed, by way of example, as a strut between a wheel of a vehicle and the chassis or body thereof. However, it is noted that the device may be used wherever it is desired to have a yieldable support, a suspension device, a rebound control device, a shock absorbing device, an energy storing device, and so forth. As shown in Figure 1, arm 2 is pivoted at one end to a part of the chassis or body 3 of a vehicle and its other end has rotatably mounted thereon a wheel 4. Between arm 2 and another body part 5 of the vehicle there is interposed the device or strut 1, the connection being made by ball and socket connections 6 and 7.

The yieldable device or strut I is shown in detail in Figures 2, 3, 4, and 5, reference to which is now made. The strut is composed of two telescoping cylinders 8 and 9, the former being closed at its upper end by a cap 10 provided with a ball 11 forming part of the ball and socket connection 7 and cylinder 9 being closed at its lower end by a cap 12 provided with a socket 13 for receiving ball 14 of the ball and socket connection 6, said ball being held in the socket by a plate 15. The external diameter of cylinder 8 is somewhat less than the internal diameter of cylinder 9, thus producing a chamber 16 between the walls of the two cylinders. The lower end of cylinder 8, which is received in cylinder 9, carries a sleeve 17 which has such an external diameter as to snugly fit in cylinder 9 so as to properly guide the lower end of cylinder 8. This sleeve is provided with a plurality of circumferentially spaced openings 18 for placing chamber 16 in communication with the interior of cylinder 9 below the sleeve.

The upper end of cylinder 9 carries bearing sleeves 19 and 20 between which is interposed suitable annular packing means 21 to prevent fluid from leaking past the two cylinders yet permitting the cylinders to have relative axial movement. The bearing sleeves and packing means are held in position by a retaining cap 22 secured to the upper end of cylinder 9.

Within cylinder 8 is a piston 23 dividing the space within the two cylinders into an upper chamber A and a lower chamber B, the former being solely within cylinder 8 and the latter within the lower part of cylinder 8 and the cylinder 9, said chamber B also including the chamber 16 between the walls of the cylinders. Chamber B is filled with non-compressible fluid such as oil or hydraulic brake fluid and chamber A is filled with a compressible fluid or gas, preferably air, under pressure. Air is admitted into chamber A through an inlet 24 in cap 10 which is controlled by an air pressure check valve 25. The non-compressible fluid is admitted to chamber B through a passage 26 in cap 12 when the closure plug 27 is removed.

Piston 23 is made from two sections 28 and 29 clamped together by bolts 30. The piston parts are so formed as to provide an annular groove 31 whereby packing cups 32 and 33 may be clamped to the piston together with a spacer ring 34. The sealing lip 35 of the upper cup 32 faces toward chamber A so that it can be acted upon by the fluid under pressure in the chamber to thus aid in maintaining sealing contact between the lip and the cylinder wall. An expander 36 is also shown to aid in the sealing action. In a like manner the lip 37 of the lower cup 33 faces toward chamber B so that the fluid under pressure in said chamber can act upon the lip to thus aid in maintaining it in sealing contact with the cylinder wall. There is also provided an expander 38 for this lip. Ring 34 is provided with an annular groove 39 which receives an O ring seal 40, thereby providing additional sealing means to prevent any transfer of fluids between chambers A and B. The parts 28 and 29 of the piston are so formed as to provide a chamber 41 which communicates with a passage 42 extending to the periphery of the ring 34 at a point between the upper cup 32 and the O ring.

When the chambers A and B are filled with fluid with the air in chamber A under pressure, the yieldable device or strut will be in operative condition. Under these conditions the pressures in both chambers are the same as the piston only acts as a movable separating wall. As the device operates when the vehicle moves, cylinders 8 and 9 will move relatively to each other both in an inward and an outward direction. As cylinder 8 moves inwardly with respect to cylinder 9, piston 23 will be forced upwardly, thus placing the air in chamber A under additional pressure since the volume thereof will be decreased. When cylinder 8 moves outwardly with respect to cylinder 9, piston 23 will move downwardly with respect to cylinder 9 and the volume of chamber A will increase. Since the air in chamber A is compressible, it will act as a cushioning means between the wheel and the frame of the vehicle and thus absorb road shocks.

In actual practice it is almost impossible to so construct a sealing cup that no air will leak past its sealing lip. Thus it is seen that as the piston moves relatively to the cylinder wall during the operation of the yieldable device, a small amount of air under pressure in chamber A will slowly leak by the packing cup 32 and begin to build up a back pressure between the two packing cups. As this back pressure increases, the sealing action of the cup will decrease (due to pressure on both sides of the lip) until there is a substantial failure thereof, at least such a failure that air will become mixed with the non-compressible fluid in chamber B and the fluid from chamber B will be mixed with the air in chamber A. This, of course, has been found to be very undesirable since it results in the deterioration of the oil and improper functioning of the device. The provision of chamber 41 in piston 23, which can be called a dead air chamber, tends to decrease the building up of this back pressure between the two lips and thus decreases the possibility of leakage past the lips of the cups. If the pressure in chamber A should, for example, be about four hundred pounds per square inch, then as leakage occurs at the lip 35, the air in chamber 41 will begin to increase and may reach a pressure even as high as two hundred pounds per square inch. However, during the functioning of the strut, as already pointed out, there will be a drop in the pressure of the air in chamber A when cylinders 8 and 9 move relatively away from each other. If this drop in pressure should be below the pressure of air in chamber 41, then the pressure in chamber 41 will also drop since air can very readily slip by the lip of the cup back into chamber A as the cup has little or no sealing action against flow of fluid in this direction. Thus the pressure in the dead air chamber will be continuously maintained below the normal pressure in chamber A, that is, the air pressure which is originally placed in the chamber with the vehicle at rest. Thus it is seen that the dead air chamber in the piston acts as a means for preventing such high back pressures building up behind the lips of the cups that there will be serious leakage. By having the volume of chamber 41 substantially large, there will be no danger of any rapid build up of back pressure as would be the case if this chamber were not present and the leakage of fluid past the cup were confined to the very small space at the periphery of the piston and lying between the cups. The passage 42 communicates with the periphery of the piston between the O ring and the lip 35 of cup 32 and operates solely to compensate for the building up of back pressure by leakage of air since a sealing cup will permit leakage of air more rapidly than leakage of liquid, it being well known that a liquid is much easier to seal than a gas such as air. The O ring acts as a safety seal to prevent liquid from passing the piston and since it functions also as a double seal (that is, a seal against flow of fluid in opposite directions), it will also prevent air from building up a back pressure behind lip 37.

There are conditions under which it is desired to control the flow of fluid from the lower part of cylinder 9 to the lower part of cylinder 8, said conditions being when a considerable force acts on the device to move the cylinders toward each other as, for example, when the entire weight of the vehicle comes down upon the device as a large obstruction is encountered or when the vehicle goes over an embankment. In order to control the flow of fluid between the two cylinder portions of chamber B and prevent too rapid a build up of pressure on the bottom of piston 23, there is provided a wall 43 at the lower end of cylinder 8 (shown in Figure 3 wherein the cylinders are in their extreme telescoping positions). This wall is held on the cylinder by the bearing sleeve 17 and is provided with an opening 44. Extending into this opening is a tapered pin 45 carried by and extending upwardly from cap 12. From this construction it is seen that as cylinder 8 moves downwardly from its position shown in Figure 2, the area of the opening 44 will be gradually decreased, thus decreasing the rate of flow between the lower ends of cylinders 9 and 8. By decreasing the rate of flow, the downward movement of cylinder 8 will be slowed up or checked when there is a large force acting to move cylinders 8 and 9 toward each other, and the force will not become effective immediately on the piston and air chamber A. The force will thereby be slowly absorbed.

Also, in order to check too rapid a separating movement of cylinders 8 and 9, there is provided a ring 46 for cooperation with the upper ends of passages 18 which places the chamber 16 in communication with the lower part of cylinder 9. This ring, as seen in Figures 3 and 5, has two openings 47 and when fluid tends to flow out of chamber 16 due to the relative outward movement of cylinders 8 and 9, the ring will seat on top of the sleeve 17 and all fluid must flow through these two openings 47. The ring will have no effect in controlling the flow of fluid through passages 18 when the cylinder 8 moves inwardly with respect to cylinder 9 since under these conditions the fluid flowing through passages 18 will lift the ring off sleeve 17 and flow around the ring. The ring in Figure 3 is shown in an unseated position and engaged with a shoulder 48 for limiting its unseating movement.

I have also provided means for facilitating the proper filling of chamber B with the non-compressible fluid. The structure involved is shown in Figure 4. When chamber B is to be filled with liquid, the cylinders are moved relatively outwardly to their fullest extent. This may be done by merely dropping the wheel over a pin or jacking up the vehicle. Chamber A is then opened to atmosphere by opening the bleeder plug 49 and liquid is forced under a slight pressure into the chamber B through passage 26 after removing the plug 27. As chamber B is filled, piston 23 will be forced upwardly until it engages cap 10 at the upper end of cylinder 8. When the piston is in this position, the lip 37 of cup 33 will be over a plurality of circumferentially spaced recesses 50 in the wall of cylinder 8. Thus the lip cannot seal at these recesses and liquid can flow around the edge of the lip. There is also provided similar circumferentially spaced recesses 51 which will be opposite the O ring 40 when the piston is in its extreme upper position so that liquid can pass around this O ring. Thus with these recesses positioned as shown, liquid can flow by all the seals (liquid will slip by lip 35 due to its position) and out by way of the bleeder plug as liquid is forced into chamber B. When all the air has been expelled from chambers B and A, the bleeder plug 49 is closed. During this filling operation a small amount of liquid will get into the bottom of chamber 41 but this will not be harmful as the major portion of the chamber will still be filled with air.

Air under pressure is now forced into chamber A through valve 25. This will cause piston 23 to be moved downwardly and push liquid out of passage 26. Air will not pass the piston under these conditions because the lip 35 of the sealing cup 33 functions to prevent passage of air since there is no recess underneath this lip. As the piston initially moves downwardly, the O ring will pass below the recesses 50 and 51 and function as a seal so as to prevent air from passing the piston when lip 35 of cup 32 passes the recesses 50 and 51. Air under pressure is placed in chamber A until piston 23 engages wall 43 at the lower end of cylinder 8. When this occurs, passage 26 is closed by the filler plug 27. The device will now contain the proper amount of non-compressible fluid. Air under pressure is continued to be placed in chamber A until it reaches the desired predetermined pressure which will depend upon how high it is desired to have the vehicle frame above the roadway and also the temperature conditions under which the device is to be operated. When the device is used for each wheel, the amount of air in each chamber A is such that the vehicle will be level when the wheels are on a level roadway.

In Figure 6 I have shown a slightly modified arrangement for performing the filling operation. In this modification the piston 23' is shown without a chamber and with two axially spaced sealing cups 52 and 53 in order to simplify the showing. The piston head is provided with a central passage 54 and on the chamber B side thereof is a yieldable valve seat 55 in the form of a disc. Cooperating with this seat is a valve element 56 carried by a stem 57 extending through the opening 54. On the chamber A side of the head of the piston there is a sealing disc 58 having a lip portion 59 cooperating with the stem to prevent fluid from flowing back through passage 54 but not preventing fluid from flowing in the opposite direction around the stem. A perforated cap 60 rests on top of the sealing disc 58. The sealing disc, the cap and the valve seat 55 are all held on the head of the piston by bolts 61. Cooperating with the stem 57 and the cap 60 is a leaf spring 62 which normally biases the valve element 56 to seated position. The head of the piston also has a passage 63 to facilitate the flow of fluid from one side of the head to the other when the valve element 56 is unseated.

With the valve arrangement shown it is obvious that during the filling operation when chamber B is filled with liquid under a slight pressure, piston 23' will be moved upwardly as valve element 56 is seated. When the piston reaches the top of cylinder 8, stem 57 will engage cap 10, thereby unseating valve element 56 and permitting liquid in chamber B to flow out through chamber A and the bleeder plug and thus expel all the air. After the bleeder plug is closed and air under pressure is forced into chamber A causing the piston to move downwardly, valve 56 will automatically become seated as soon as there is initial movement of the piston since spring 62 can then come into action to perform the seating operation. The lip 59 of the sealing disc 58 will prevent air from passing around stem 57 and, of course, fluid cannot pass from chamber B to chamber A because valve element 56 is seated. The pressure in chamber B will continue to hold valve element 56 seated since it acts upon a larger area than the cross-sectional area of the stem which is subject to a like pressure in chamber A. When piston 23' reaches the lower end of cylinder 8, chamber B is sealed and additional air under pressure is put into chamber A.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a device having a cylinder and a piston capable of relative movement and in which the piston is subject to a compressible gas under pressure on one side and to a non-compressible fluid under pressure on the other side, a sealing cup carried by the piston and having a sealing lip subject to the pressure of the gas, means forming a dead gas chamber of substantial volume for movement with the piston, means for placing the chamber in constant communication with the rear of said cup, and other sealing means carried by the piston for preventing the non-compressible fluid from entering the chamber or the gas from mixing with the non-compressible fluid.

2. In a device having a cylinder and a piston capable of relative movement and in which the piston is subject to fluid pressures on opposite sides thereof, a sealing cup carried by the piston and having a lip extending toward one end of the piston and subject to the pressure effective on that end of the piston to thereby assist in maintaining a sealing action with the cylinder wall to prevent fluid from flowing past the piston from said one end but permitting fluid to flow past said lip to the said one end, a chamber of substantial volume formed within the piston and in constant communication with the space at the rear of the lip, an axially spaced sealing cup carried by the piston and having its lip exposed to the pressure effective on the other end of the piston, and an O ring sealing means between the rear of the last named cup and the chamber.

3. In a yieldable device of the class described, two telescoping cylinders closed at their outer ends, a piston positioned in one cylinder and dividing the space within the cylinders into two chambers, a non-compressible fluid in one chamber, a compressible fluid under pressure in the other chamber, axially spaced sealing cups carried by the piston, said cups being provided with sealing lips cooperating with the cylinder wall and arranged so that the cup adjacent each chamber will have its lip acted upon by fluid pressure in that chamber to thereby aid in maintaining sealing contact, means forming a third chamber of substantial volume in the piston, means for placing said third chamber in communication with the peripheral part of the piston between the two sealing means, and a seal for preventing fluid from flowing from the third chamber to the rear of the lip of the cup adjacent the chamber containing the non-compressible fluid.

4. In a device having a cylinder and a relatively movable piston therein providing separated chambers, said piston having a normal operating range of relative movement remote from the ends of the cylinder, fluid in both chambers, the fluid in at least one of the chambers being in the form of a liquid, a plurality of sealing means for the piston for preventing interchange of fluid between the chambers, and the chamber walls of one of said chambers having recess means formed therein for permitting liquid from said liquid containing chamber to by-pass the piston and its sealing means only when the piston is positioned at the end of the cylinder remote from the liquid containing chamber, said sealing means preventing any return flow of fluid to the liquid containing chamber when the piston is in any other position in the cylinder and regardless of differential pressures existing on opposite sides of the piston.

5. In a yieldable device of the class described, two telescoping cylinders closed at their outer ends, a piston positioned in one cylinder and dividing the space within the cylinders into two chambers, a non-compressible fluid in one chamber, a compressible fluid under pressure in the other chamber, a plurality of sealing means carried by the piston for preventing fluid from passing the piston in either direction, and said cylinder walls having recess means formed therein operable only when the piston is at the closed end of the cylinder in which it is positioned for permitting the non-compressible fluid to by-pass the piston and its sealing means, said sealing means preventing compressible fluid from passing the piston in either direction when it is in a position remote from said closed end of the cylinder and regardless of differential pressures existing on opposite sides of the piston.

6. In a device having a cylinder and a relatively movable piston therein providing separated chambers, said piston having a normal operating range of relative movement remote from the ends of the cylinder, fluid in both chambers, the fluid in at least one of the chambers being in the form of a liquid, two axially spaced sealing cups carried by the piston, said sealing cups having lips projecting toward opposite ends of the piston, and means comprising a recess in the wall of the cylinder for permitting liquid to pass the lip of that cup for that end of the piston acted upon by the liquid but only when the piston is moved to the end of the cylinder which is at that side of the piston opposite the liquid containing chamber, and when said sealing means for said liquid is opposite said recess.

7. In a device having a cylinder and a relatively movable piston therein providing separated chambers, said piston having a normal operating range of relative movement remote from the ends of the cylinder, fluid in both chambers, the fluid in at least one of the chambers being in the form of a liquid, two axially spaced sealing cups carried by the piston, said sealing cups having lips projecting toward opposite ends of the piston, an O ring sealing means carried by the piston between the cups, and means comprising recesses in the wall of the cylinder cooperating with the lip of the cup sealing the liquid side of the piston and with the O ring but only when the piston is at one end of the cylinder to thereby permit liquid to by-pass the piston, said recesses and the O ring and cup lip cooperating therewith being so related to each other and the position of the lip of the other cup that the O ring will perform its sealing action during the time that the piston is being moved away from the end of the cylinder and the lip of said other cup is passing over the recesses.

WERNER F. BOLDT.